United States Patent Office

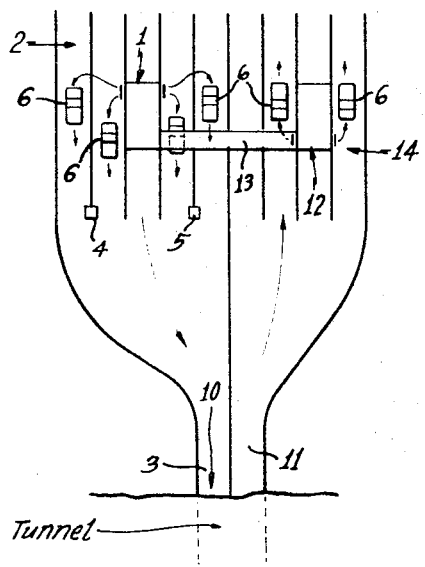
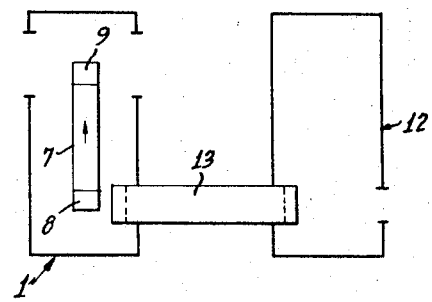
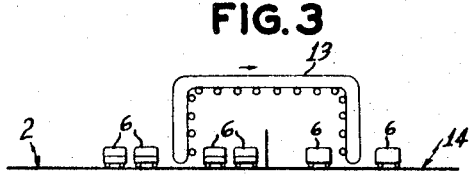
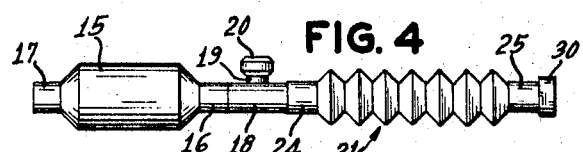
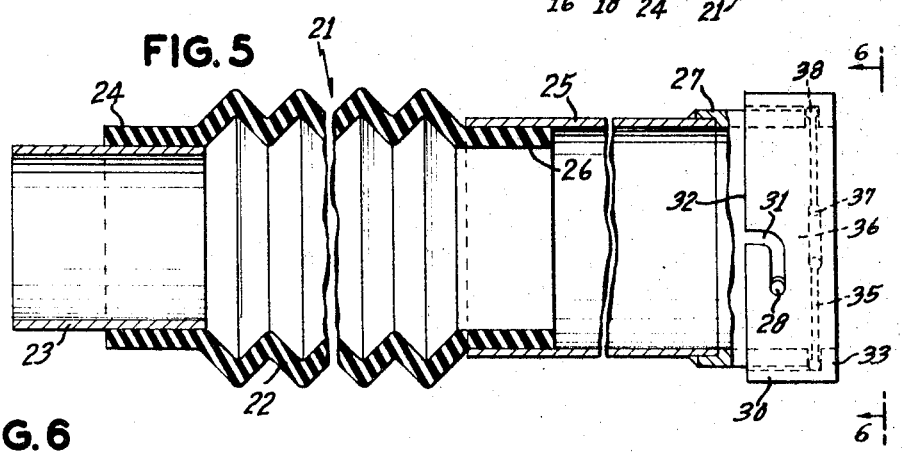
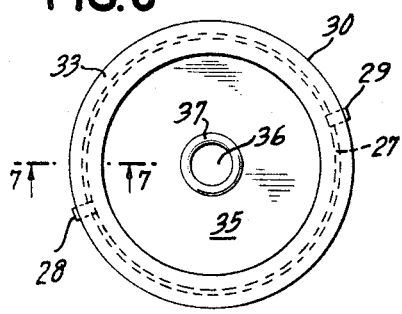
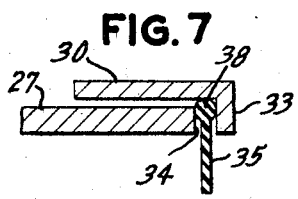

3,443,911
Patented May 13, 1969

3,443,911
APPARATUS AND SYSTEM FOR THE PURIFICATION OF INTERNAL COMBUSTION ENGINE EXHAUST GASES
Carl D. Keith, Summit, Charles E. Cunningham, East Orange, and Teunis Schreuders, Irvington, N.J., assignors to Engelhard Industries, Inc., Newark, N.J., a corporation of Delaware
Filed June 7, 1966, Ser. No. 555,740
Int. Cl. B01j 9/04
U.S. Cl. 23—288                  7 Claims This invention relates to apparatus and system for the purification of internal combustion engine exhaust gases, and more particularly to exhaust gas purification of vehicles passing through tunnels.

Tunnels for automobile traffic are usually provided with ventilation systems especially when the tunnels are of considerable length, since the exhaust gases from the vehicles cause objectionable air pollution problems in the tunnels. When traffic through the tunnels is even moderately heavy, the capacity of the ventilation system is inadequate to abate the air contaminating gases so that there is a build-up of air pollution which, apart from obnoxious odor, becomes a health hazard due to the carbon monoxide combustion product of the vehicle engines.

It is an object of the invention to provide a system for reducing or eliminating air pollution in tunnels due to automobile exhaust gases.

It is another object of the invention to provide an apparatus for easily applying and easily removing a catalytic purification apparatus to vehicles entering and leaving a tunnel.

Other objects and advantages of the invention will become apparent from the description hereinafter following and the drawings forming part hereof, in which:

FIGURE 1 is a schematic view of a typical system in accordance with the invention, FIGURE 2 is an enlarged schematic view of embodiments of FIGURE 1, FIGURE 3 is a schematic view of an embodiment of FIGURE 2, FIGURE 4 is an elevational view of a catalytic exhaust purifier unit with tail pipe connector, FIGURE 5 is a partly cross-sectional and partly elevational enlarged side view of a tail pipe connector according to the invention, FIGURE 6 illustrates an end view along lines 6—6 of FIGURE 5, and FIGURE 7 illustrates a cross-sectional view along lines 7—7 of FIGURE 6.

The present invention is directed to a system and apparatus for purifying combustion engine exhaust gases whereby air pollution in tunnels is reduced to a safety level not injurious to the health of passengers using the tunnels. In accordance with the invention vehicles, which are about to enter a tunnel, are equipped with a pre-heated easily applied and easily removed catalytic purification apparatus connected to the vehicle exhaust gas pipes. The apparatus is particularly maintained at a temperature insuring immediate catalytic activity during its removal from one vehicle leaving the tunnel and its application to another vehicle entering the tunnel from the opposite direction.

In accordance with FIGURES 1 to 3, the system of the invention includes the provision of an entrance station 1 on the entrance roadway 2 preceding tunnel entrance 3. The roadway 2 is also provided with conventional toll booths 4 and 5. When vehicles 6 enter the roadway 2, they stop near the entrance station 1 where they are equipped with a catalytic exhaust purifier unit attached to the vehicle tail pipes, e.g. by a tail pipe connector hereinafter more particularly described, and proceed to toll booths 4 and 5. Alternatively, the toll booths may precede the pre-heat station 1. The entrance station 1 is used to initially pre-heat a catalytic purification unit to a temperature at which the catalytic purification unit will operate efficiently. In the pre-heat station 1 is located a heating means 7, such as an oven, through which catalytic purifier units are passed from the oven inlet 8 to the oven outlet 9 from which the heated units are removed and applied to vehicles 6. When the vehicle tail pipes are equipped with the pre-heated exhaust purification units, they proceed through the tunnel 10. Both ends of the tunnel are provided with identical systems as ilustrated in FIGURES 1 to 3 to accommodate two-way traffic through the tunnel.

When the vehicles emerge from the tunnel exit 11, they are stopped at catalytic unit removal station 12 where the catalytic units are removed from the vehicle tail pipes.

While the vehicles have been travelling through the tunnel, the hot exhaust gases maintain the catalyst of the catalytic units at a temperature at which the unit operates efficiently. Upon removal of the catalytic unit from the vehicle exhaust pipe, it is still in the heated operating condition and now does not require a pre-heat. Therefore, the removed unit is attached to an overhead conveyor 13 which passes from the removal station 12 on exit roadway 14 to the entrance station 1 on entrance roadway 2. While the catalytic unit is still in the heated condition, it is removed from the overhead conveyor 13 in the entrance station 1 and therefrom transferred to another vehicle awaiting entrance to the tunnel. The transfer of the catalytic units is repeated from exit vehicle to entrance vehicle.

The catalytic purification unit herein referred to is illustrated by reference numeral 15 in FIGURE 4 and may be of the type described in application Ser. No. 465,955, filed June 22, 1965.

Regarding FIGURE 4, the catalytic purification unit 15 has an inlet portion 16 and an outlet portion 17. The inlet portion 16 is connected to an inspirator 18 for admixing air with the exhaust gases from the internal combustion engine. The inspirator is provided with an air inlet conduit 19 with air entering the inspirator through a filter and flame arrestor 20. A tubular tail pipe connector or adapter 21 is connected into the inspirator 18 at one end and to a vehicle tail pipe at its other end. FIGURES 5 and 6 illustrate the structure of the tail pipe adapter 21. Preferably, the tail pipe adapter is provided with a flexible corrugated or accordion-like main tube 22 made of silicone rubber and having a metal sleeve 23 bonded internally of an end 24 of tube 22 and extending outwardly of the end 24. The sleeve 23 is dimensioned to fit snugly into inlet 16 of inspirator 18 of FIGURE 4. The other end of the flexible tube 22 is also provided with a metal sleeve 25 bonded to the end 26. A metal collar 27 is welded to an end of sleeve 25 and the collar is provided with diametrically opposed studs 28 and 29 extending radially in opposite directions from collar 27. A metal locking ring 30 having a pair of diametrically positioned L-shaped slots 31 opening in a common edge 32 is mounted on collar 27 with the studs 28 and 29 engageable with the slots in locking the ring on the collar. The ring 30 has an inwardly directed flange 33 which caps the free end 34 of collar 27. Inserted between the end 34 of collar 27 and the flange 33 of ring 30, as illustrated in FIGURES 5, 6 and 7, is an elastic disk 35, preferably of silicone rubber, having a central or axial opening 36 defined by a circular reinforcing bead 37. The periphery of the disk is also defined by a reinforcing bead 38 which is positioned between collar 27 and ring flange 33. The inner diameter of ring 30 is slightly greater than the outer diameter of collar 27 so that when the locking ring is mounted on the collar and turned clockwise with the studs 28 and 29 in L-shaped slots 31, the peripheral bead is elastically deformed to seal the space between collar 27 and ring 30. At the same time, the elastic bead exerts an elastic pressure sufficient to maintain the studs 28 and 29 in slots 31 under elastic tension. With the disk 35 being elastic, the opening 36 and bead 37 are elastically deformable to enable the disk 35 to be adaptably applied universally over the ends of automobile tail pipes of different diameters. In such case, the adapter 21 is adaptable for use on tail pipes of various types of automobiles.

With a universally applicable adapter described above, the time for mounting and removing the catalytic unit from a vehicle is advantageously short and permits a rapid exchange of the catalytic unit from one vehicle to another by means of the overhead conveyor 13 of FIGURES 1 to 3. With such a rapid exchange, the catalytic unit operating temperature of 150° C.–400° C., preferably 250° C.–300° C., is maintained during the exchange and assures immediate operation of the catalyst unit without necessity for pre-heating.

VW engine specifications are as follows: 4 cylinder overhead valves, bore=3.03 inches, stroke=2.52 inches, displacement=72.74 cu. in., maximum brake H.P.=40 at 3900 r.p.m., air cooled engine.

The catalytic purifier was evaluated using a test procedure which simulated driving conditions. It consisted of a number of sequences of idling, acceleration, and deceleration under controlled conditions. A chassis dynamometer was used to effect operating conditions. The inlet stream and the exhaust were analyzed by IR (Beckman Infrared Analyzer) to determine the CO and hydrocarbon removal at various conditions. The hydrocarbon was based on n-hexane as the standard.

In this test the catalyst was installed cold, i.e. without being preheated. The results in Table I show that the catalyst did not "start-up" immediately on being installed. Once heated sufficiently, when the engine was accelerated to 30 m.p.h., the catalyst was effective for the removal of CO. However, the start-up was not sufficiently rapid when the catalyst was cold and at 20 m.p.h. (the speed limit in some tunnels) it is believed that the catalyst might not be sufficiently active for CO removal.

TABLE I

| Time, min. | Speed m.p.h. | CO Up-stream | CO Down-stream | $CO_2$ Up-stream | $CO_2$ Down-stream | Temp., °C. UP | Temp., °C. Down | Catalyst pyrometer reading | Remarks |
|---|---|---|---|---|---|---|---|---|---|
| 0 | 0/Idle | | | | | | | | Start cold engine and placed on idle. |
| 1 | Idle | 3.95 | | 3.8 | | 70 | | | |
| 3 | Idle/20 | | | | | | | | Accelerated to 20 m.p.h., maintained 20 in 3rd gear. |
| 6 | 23 | 3.2 | | 12.0 | | | | | Catalyst installed. |
| 9 | 23 | | | | | | | | |
| 9 | 23 | 3.3 | 2.1 | 12.0 | 7.2 | 210 | | Yellow | |
| 13 | 23/30 | | | | | | | | Accelerated to 30 m.p.h., maintained 30 in 4th gear. |
| 16 | 30 | 3.5 | 0 | 12.4 | 10.8 | 240 | 330 | Active green | Catalyst ignited immediately. Engine at 30 m.p.h. in 4th gear. |
| 20 | 30/20 | | | | | | | | Decelerated to 20 m.p.h. in 3rd gear. |
| 22 | 20 | 4.4 | 0 | 11.4 | 9.8 | 200 | 420 | Active green | 3rd gear. |
| 26 | 20/10 | | | | | | | | 3rd gear decelerate to 10 m.p.h., in 3rd gear. |
| 30 | 10 | 5.0 | 0 | 3.7 | 11.3 | 100 | 480 | Active green | 10 m.p.h. in 3rd gear. |
| 32 | 10 | | | | | | | | Shifted to and maintained 20 m.p.h. in 2nd gear. |
| 34 | 10 | 3.4 | 0 | 3.4 | 9.7 | 100 | 540 | Active green | 2nd gear. |
| 36 | 10/Idle | | | | | | | | Decelerate to idle-out of gear. |
| 38 | Idle | 2.8 | 0 | 3.0 | 7.4 | 80 | 430 | Active green | |
| 46 | Idle/Off | 2.8 | 0 | 3.1 | 7.4 | 80 | 420 | do | Engine off. |

Example 1

A catalytic purifier containing a unitary catalyst about 3½" diameter x 3" length and comprised of a zircon-mullite refractory skeletal structure with about 200 gas flow channels per square inch of support and having deposited thereon a precious metal catalyst of about 0.5% Pt supported on about 10% activated alumina (based on total weight of the catalyst) was installed on one exhaust pipe of a 1963 Volkswagen sedan. The purifier was equipped with a venturi having an 0.650" inlet cone. The Example 2

In the following test, a catalytic purifier similar to that described in Example 1, except that the dimensions of the catalyst bed were 4½" diameter x 3" length, was installed on a 1963 Volkswagen sedan after being preheated for 1 hour at 200° C. The catalyst was tested using a similar procedure to that described in Example 1. Immediately after testing on the 1963 car, the catalyst was removed and installed on a 1964 Volkswagen convertible. The test results are summarized in Table II.

TABLE II

| | $CO_2$ (Percent) | | CO (Percent) | | | Hydrocarbon (Percent) | | |
|---|---|---|---|---|---|---|---|---|
| | Up-stream | Down-stream | Up-stream | Down-stream | Removal | Up-stream | Down-stream | Removal |
| Speed, m.p.h.: | | | | | | | | |
| 30 | | 8.40 | | 0.0 | | | 89 | |
| Idle | 4.00 | 9.20 | 4.05 | 0.0 | 100 | 1,677 | 114 | 93.2 |
| 10 | 8.20 | 10.70 | 3.20 | 0.05 | 98.4 | 263 | 70 | 73.3 |
| 20 | 8.20 | 10.80 | 2.40 | 0.05 | 97.9 | 212 | 72 | 66.0 |
| 30 | 8.00 | 10.10 | 1.90 | 0.05 | 97.3 | 212 | 74 | 65.0 |
| 40 | 8.00 | 8.60 | 1.00 | 0.05 | 95.0 | 217 | 104 | 52.1 |
| Total | | | 12.55 | 0.20 | 98.4 | 2,581 | 434 | 83.1 |
| Above test taken on 1963 VW Sedan | | | | | | | | |
| Idle | 5.60 | 8.60 | 2.40 | 0.05 | 97.9 | 1,688 | 173 | 87.7 |
| 10 | 7.60 | 11.60 | 3.47 | 0.05 | 98.5 | 461 | 129 | 72.0 |
| 20 | 8.00 | 12.00 | 2.70 | 0.05 | 98.1 | 434 | 118 | 72.8 |
| 30 | 6.90 | 11.20 | 2.10 | 0.05 | 97.6 | 375 | 120 | 68.0 |
| 40 | 7.50 | 10.10 | 2.10 | 0.05 | 97.6 | 336 | 136 | 59.5 |
| Total | | | 12.77 | 0.25 | 98.0 | 3,294 | 676 | 79.4 |
| Above test taken on 1964 VW Convertible | | | | | | | | |

Example 3

The low back pressure characteristic of the unitary ceramic catalyst was demonstrated in a test on a 1964 VW using a catalyst purifier of the type described in Example 1, except that it was equipped with a venturi having an 0.605″ diameter inlet cone. As in previous tests, only one purifier was used, one exhaust pipe was plugged. At a steady 50 m.p.h., the back pressure was only 1.0 p.s.i.g load set and the purifier installed. In actual practice, it has been demonstrated that a unit can be installed and the car started up in 30 seconds.

TABLE III

| Car | Time (Mins.) | Operating Conditions | Percent $CO_2$ Up | Percent $CO_2$ Down | Percent CO Up | Percent CO Down | p.p.m. H/C Up | p.p.m. H/C Down | Temperature Up | Temperature Down |
|---|---|---|---|---|---|---|---|---|---|---|
| 1962 8-cyl. Buick | 4 | Idle (Out of gear) | 8.30 | 9.10 | 7.80 | 6.30 | | | 60 | 200 |
| | 6 | Accelerated to 25 m.p.h. Sample at steady 25 m.p.h.—3rd Gear. | 8.20 | 10.60 | 7.93 | 3.30 | | | 80 | 275 |
| | 11 | Steady 25 m.p.h.—3rd Gear | | 11.30 | | 0.26 | | | | |
| | 15 | Decelerated to Idle and purifier removed and installed on 1955 Chevrolet. | | | | | | | | |
| 1955 6-cyl. Chevrolet | 18 | Accelerated to 25 m.p.h. Sample at steady 25 m.p.h.—3rd Gear. | 12.9 | 9.2 | 0.98 | 0.92 | | | 70 | 190 |
| | 27 | Purifier removed and installed on 1964 VW. | (Car too lean to give good catalyst ignition) | | | | | | | |
| 1964 4-cyl. VW | 31 | Accelerated to 25 m.p.h. Sample at 25 m.p.h.—2nd Gear. | 10.7 | 5.7 | 3.92 | 3.75 | 434 | 235 | 140 | 80 |
| | 41 | Accelerated to 40 m.p.h. and decelerated to 25 m.p.h. | 10.6 | 11.2 | 6.49 | 0.0 | | | 225 | 210 |
| | 46 | Steady 25 m.p.h. | 10.3 | 10.2 | 4.04 | 0.0 | | | 210 | 480 |
| | 49 | Decelerated from 25 m.p.h. to Idle | 6.1 | 10.7 | 8.51 | 0.0 | | | 115 | 590 |
| | 52-54 | Purifier removed from VW and installed on Rambler. | | | | | | | | |
| 1963 6-cyl. Rambler | 57 | Steady 25 m.p.h. in 3rd Gear | 11.1 | 12.1 | 3.82 | 0.24 | 502 | 232 | 95 | 520 |
| | 63-65 | Decelerated to Idle and purifier removed from Rambler, installed on 1964 VW, and accelerated to 25 m.p.h. | | | | | | | | |
| 1964 4-cyl. VW | 66 | Steady 25 m.p.h. in 4th Gear | 11.0 | 10.0 | 3.52 | 0.0 | | | 110 | 490 |
| | 71 | do | 11.0 | 10.0 | 3.62 | 0.0 | 268 | 135 | 180 | 400 |

Example 4

A catalytic purifier similar to that described in Example 3 was installed cold on a VW and heated in a number of sequential steps such as accelerating the car to 40 m.p.h., decelerating to 25 m.p.h. and idling. The unit was then removed from the VW and installed on a 1962 Buick. After testing in the above described manner, it was installed and tested on a 1955 Chevrolet, a 1964 VW, a 1963 Rambler, and then on a 1964 VW.

A summary of the test results is shown in Table III. In the table the time of the installation of the pre-heated catalyst on the 1962 Buick was taken as the start of the test. "UP" and "DOWN" refer to upstream and downstream of the catalyst, respectively.

This test demonstrates that the purifier is effective for removing CO from the exhaust and is easily adapted for a variety of automobiles. Note that there was a time lag in installing the purifier due to test conditions. Each car had to be driven onto a dynamometer after the previous test car was driven off. Then the car had to be placed;

Example 5

A catalytic purifier similar to that described in Example 3 was installed on a 1965 Volvo. The test results are summarized in Table IV.

TABLE IV

| Speed, m.p.h. | Temperature Up | Temperature Down | Percent $CO_2$ Up | Percent $CO_2$ Down | Percent CO Up | Percent CO Down | Percent Removal | P.p.m. H/G Up | P.p.m. H/G Down | Percent Removal |
|---|---|---|---|---|---|---|---|---|---|---|
| S 50 | 200 | 380 | 8.2 | 10.40 | 1.50 | 0.0 | 100 | 432 | 108 | 75.0 |
| S 40 | 190 | 450 | | 11.80 | | 0.031 | | | 101 | |
| S 30 | 190 | 420 | 6.5 | 12.70 | 4.04 | 0.0 | 100 | 463 | 94 | 79.6 |
| S 20 | 190 | 350 | 2.5 | 8.60 | 7.42 | 0.0 | 100 | 1424 | 157 | 88.9 |
| S 10 | | | 4.8 | | 2.78 | 0.0 | 100 | 1945 | | |
| Idle | 200 | 350 | 5.95 | 12.50 | 5.46 | 0.0 | 100 | 530 | 72 | 86.4 |

S=Steady.

Example 6

A purifier of the type described in Example 3 was installed on a 1964 Ford V-8 engine powered with propane after it had been used in tests corresponding to 644 miles on leaded gasoline and 94 miles on propane. After running the engine at idle for approximately 10 minutes, the catalyst was tested. The results are shown in Table V.

TABLE V

| M.p.h. | Gear | Percent CO Up | Percent CO Down | Percent $CO_2$ Up | Percent $CO_2$ Down | P.p.m. H/G Up | P.p.m. H/G Down | Temp., °C. Up | Temp., °C. Down |
|---|---|---|---|---|---|---|---|---|---|
| 50 | 4 | 1.6 | .1 | 14.0 | 10.5 | 200 | 140 | 220 | 350 |
| 40 | 4 | 3.8 | 0 | 10.2 | 12.0 | 250 | 120 | 220 | 420 |
| 30 | 4 | 7.0 | 0 | 11.2 | 14.0 | 290 | 95 | 180 | 510 |
| 30 | 3 | 6.4 | 0 | 12.2 | 14.0 | 285 | 100 | 170 | 500 |
| 20 | 2 | 8.1 | 0 | 11.0 | 15.8 | 230 | 90 | 170 | 550 |
| 10 | 1 | 9.7 | .3 | 10.2 | 16.8 | 340 | 150 | 160 | 550 |
| Idle | | 4.5 | 0 | 4.2 | 15.0 | 1,400 | 70 | 120 | 530 |

A test run for over 1000 miles using leaded gasoline showed similar clean up. Catalysts of this type showed good CO removal for more than 10,000 miles.

Various modifications of the invention are contemplated within the scope of the appended claims.

What is claimed is:

1. A system for the purification of internal combustion engine exhaust gases of vehicles passing through traffic tunnels, comprising an entrance station located at an entrance to a tunnel, a catalytic exhaust gas purifier unit, adapter means secured to the purifier unit for connecting the purifier unit to an exhaust gas outlet of a vehicle at the entrance station, a purifier unit removal station at a tunnel exit substantially adjacent the entrance station for the removal of the purifier unit from the exhaust gas outlet of a vehicle at the removal station, and means for pre-heating the purifier unit at a location prior to its transfer to an exhaust outlet of a vehicle at the entrance station.

2. A system according to claim 1, wherein the adapter means comprises a conduit connectable at one end to the purifier unit, the other end of the conduit having a collar secured thereto, a locking ring member mounted on the collar, an elastic disk member secured between the collar and the locking ring transversally of the conduit axis, and a central opening in the elastic disk member.

3. A system according to claim 2, wherein the conduit is a flexible conduit.

4. A system according to claim 2, wherein the central opening of the elastic disk is defined by an annular bead.

5. A system according to claim 4, wherein the periphery of the elastic disk is defined by an annular bead.

6. A system according to claim 1 wherein the pre-heating means is the exhaust gas outlet of the vehicle at the removal station.

7. A system for the purification of internal combustion engine exhaust gases of vehicles passing through traffic tunnels, comprising a catalytic exhaust gas purifier unit, an entrance station located at an entrance to a tunnel, heating means in the entrance station for pre-heating the purifier unit, adapter means secured to the purifier unit for connecting the purifier unit to an exhaust gas outlet of the vehicle engine entering the tunnel, a purifier unit removal station located at a tunnel exit adjacent the tunnel entrance of the traffic tunnel, and catalytic unit conveyor means passing from the removal station to the entrance station, whereby the heated catalytic unit removed from a vehicle leaving the tunnel is transferred too the entrance station for connection to a vehicle entering the tunnel.

References Cited

UNITED STATES PATENTS 3,173,710  3/1965  Kinnison _____ 181—72

MORRIS O. WOLK, *Primary Examiner.*

M. D. BURNS, *Assistant Examiner.*

U.S. Cl. X.R.

60—29; 181—47.1